United States Patent
Nguyen et al.

(10) Patent No.: US 10,437,843 B2
(45) Date of Patent: Oct. 8, 2019

(54) OPTIMIZATION OF DATABASE QUERIES VIA TRANSFORMATIONS OF COMPUTATION GRAPH

(71) Applicant: MICROSOFT TECHNOLOGY LICENSING, LLC

(72) Inventors: Patrick An Phu Nguyen, Palo Alto, CA (US); Theodore Vassilakis, Los Altos, CA (US); Sreenivasa Viswanadha, Cupertino, CA (US); David Kryze, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 428 days.

(21) Appl. No.: 14/807,822

(22) Filed: Jul. 23, 2015

(65) Prior Publication Data
US 2016/0034530 A1    Feb. 4, 2016

Related U.S. Application Data

(60) Provisional application No. 62/030,560, filed on Jul. 29, 2014.

(51) Int. Cl.
*G06F 16/2458* (2019.01)
*G06F 16/2453* (2019.01)

(52) U.S. Cl.
CPC .... *G06F 16/2471* (2019.01); *G06F 16/24542* (2019.01)

(58) Field of Classification Search
CPC ......... G06F 17/30545; G06F 17/30463; G06F 16/2471; G06F 16/24542

USPC ......................................................... 707/719
See application file for complete search history.

(56) References Cited

U.S. PATENT DOCUMENTS

| | | | |
|---|---|---|---|
| 4,841,436 | A | 6/1989 | Asano |
| 6,785,668 | B1 | 8/2004 | Polo et al. |
| 7,668,798 | B2 | 2/2010 | Scanlon et al. |
| 7,707,141 | B1 | 4/2010 | Outhred et al. |

(Continued)

FOREIGN PATENT DOCUMENTS

| CN | 101218803 A | 7/2008 |
|---|---|---|
| CN | 102461026 A | 5/2012 |

(Continued)

OTHER PUBLICATIONS

Office Action dated Mar. 8, 2017 issued in U.S. Appl. No. 14/486,995.

(Continued)

*Primary Examiner* — Shahid A Alam
*Assistant Examiner* — Andalib F Lodhi
(74) *Attorney, Agent, or Firm* — Workman Nydegger

(57) ABSTRACT

Various embodiments of the present disclosure can include systems, methods, and non-transitory computer readable media configured to receive at least one database query to be executed. At least one computation graph corresponding to the at least one database query is generated. The computation graph is transformed to an optimized computation graph. The respective portions of the optimized computation graph are distributed to a plurality of distributed computing systems for execution. A result for the at least one database query is provided.

18 Claims, 5 Drawing Sheets

(56) References Cited

U.S. PATENT DOCUMENTS

| | | | |
|---|---|---|---|
| 7,765,259 B2 | 7/2010 | MacVarish | |
| 8,200,594 B1* | 6/2012 | Bleiweiss | G06T 19/003 345/474 |
| 8,645,386 B2 | 2/2014 | Hess et al. | |
| 2003/0065648 A1 | 4/2003 | Driesch et al. | |
| 2004/0088406 A1 | 5/2004 | Corley et al. | |
| 2004/0128276 A1 | 7/2004 | Scanlon et al. | |
| 2004/0181378 A1 | 9/2004 | Gilmore | |
| 2005/0119988 A1 | 6/2005 | Buch et al. | |
| 2006/0143171 A1 | 6/2006 | Doerre et al. | |
| 2006/0164990 A1 | 7/2006 | Bhushan et al. | |
| 2006/0218129 A1* | 9/2006 | Muras | G06F 17/30474 |
| 2007/0006294 A1 | 1/2007 | Hunter | |
| 2007/0087756 A1 | 4/2007 | Hoffberg | |
| 2007/0094171 A1 | 4/2007 | Burges et al. | |
| 2007/0266134 A1 | 11/2007 | Shyy et al. | |
| 2007/0299836 A1* | 12/2007 | Hou | G06F 17/30427 |
| 2008/0065455 A1 | 3/2008 | Sun et al. | |
| 2008/0114752 A1 | 5/2008 | Friesenhahn et al. | |
| 2008/0154844 A1 | 6/2008 | Gao et al. | |
| 2008/0250401 A1 | 10/2008 | Puri et al. | |
| 2008/0301136 A1 | 12/2008 | De et al. | |
| 2009/0083219 A1* | 3/2009 | Zane | G06F 8/30 |
| 2010/0058289 A1 | 3/2010 | Hudson | |
| 2010/0079336 A1 | 4/2010 | Skibiski et al. | |
| 2010/0095269 A1 | 4/2010 | Bouillet et al. | |
| 2010/0199069 A1 | 8/2010 | Kim et al. | |
| 2010/0235296 A1 | 9/2010 | Nakazato | |
| 2010/0250518 A1* | 9/2010 | Bruno | G06F 16/24 707/718 |
| 2010/0278158 A1 | 11/2010 | Lee et al. | |
| 2011/0107273 A1 | 5/2011 | Ranganathan et al. | |
| 2011/0213778 A1 | 9/2011 | Hess et al. | |
| 2011/0320433 A1 | 12/2011 | Mohiuddin et al. | |
| 2012/0030244 A1 | 2/2012 | John | |
| 2012/0047158 A1* | 2/2012 | Lee | G06F 17/30469 707/759 |
| 2012/0155277 A1 | 6/2012 | Jain et al. | |
| 2012/0159304 A1 | 6/2012 | Listou | |
| 2013/0006888 A1 | 1/2013 | Mesika et al. | |
| 2013/0024484 A1 | 1/2013 | Banerjee et al. | |
| 2013/0054649 A1 | 2/2013 | Potapov et al. | |
| 2013/0073573 A1 | 3/2013 | Huang et al. | |
| 2013/0159285 A1 | 6/2013 | Dees et al. | |
| 2013/0204811 A1* | 8/2013 | Morinaga | G06N 99/005 706/12 |
| 2013/0212255 A1 | 8/2013 | Chao et al. | |
| 2013/0262443 A1* | 10/2013 | Leida | G06F 17/30427 707/722 |
| 2013/0332194 A1 | 12/2013 | D'Auria et al. | |
| 2014/0089252 A1 | 3/2014 | Bhide et al. | |
| 2014/0101083 A1* | 4/2014 | Nicholson | G06N 99/005 706/12 |
| 2014/0172833 A1 | 6/2014 | Taylor | |
| 2014/0188841 A1 | 7/2014 | Sun et al. | |
| 2014/0214880 A1* | 7/2014 | Chi | G06F 17/30442 707/768 |
| 2014/0297353 A1 | 10/2014 | Srivastava | |
| 2015/0081701 A1 | 3/2015 | Lerios et al. | |
| 2015/0304198 A1 | 10/2015 | Angelov et al. | |
| 2016/0034529 A1 | 2/2016 | Nguyen et al. | |
| 2016/0034530 A1 | 2/2016 | Nguyen et al. | |
| 2016/0034547 A1 | 2/2016 | Lerios et al. | |
| 2017/0032016 A1 | 2/2017 | Zinner et al. | |
| 2017/0206256 A1 | 7/2017 | Tsriogiannis et al. | |

FOREIGN PATENT DOCUMENTS

| | | |
|---|---|---|
| CN | 103136217 A | 6/2013 |
| WO | 2006036127 A1 | 4/2006 |

OTHER PUBLICATIONS

Bouillet, et al., "A Tag-Based Approach for the Design and Composition of Information Processing Applications", In Proceedings of the 23rd ACM SIGPLAN Conference on Object-Oriented Programming Systems Languages and Applications, vol. 43, Issue 10, Sep. 2008, pp. 585-602.

Wongsuphasawat, et al., "Exploring Flow, Factors, and Outcomes of Temporal Event Sequences with the Outflow Visualization", In proceedings of IEEE Transactions on Visualization and Computer Graphics, vol. 18, Issue 12, Oct. 9, 2012, pp. 2659-2668.

"Extended Search Report Issued in European Patent Application No. 14843834.4", dated Apr. 18, 2017, 10 Pages.

U.S. Appl. No. 61/878,562, filed Sep. 16, 2013, Lerios et al.

U.S. Appl. No. 62/030,552, filed Jul. 29, 2014, Lerios et al.

U.S. Appl. No. 62/184,095, filed Jun. 24, 2015, Cutler et al.

U.S. Appl. No. 62/030,558, filed Jul. 29, 2014, Nguyen et al.

U.S. Appl. No. 62/030,560, filed Jul. 29, 2014, Nguyen et al.

"International Application No. PCT/US2014/055699, International Search Report and Written Opinion", dated Dec. 8, 2014.

"International Search Report & Written Opinion Issued in PCT Application No. PCT/US2015/042529", dated Oct. 23, 2015, 9 Pages.

"Written Opinion Issued in PCT Application No. PCT/US2015/042535", dated Oct. 23, 2015, 8 Pages.

"Second Written Opinion in PCT Application No. PCT/US2015/042538", dated Nov. 3, 2015, 7 pages.

Office Action dated Dec. 15, 2016 issued in U.S. Appl. No. 14/486,995.

Office Action cited in U.S. Appl. No. 14/810,144 dated Feb. 28, 2018.

Office Action dated Nov. 30, 2017 cited in U.S. Appl. No. 14/865,995.

Office Action dated Sep. 25, 2017 cited in U.S. Appl. No. 14/807,807.

Office Action dated Sep. 11, 2017 cited in U.S. Appl. No. 14/810,144.

"Non Final OFfice Action Issued in U.S. Appl. No. 14/486,995", dated Nov. 30, 2017, 23 Pages.

"Office Action Issued in U.S. Appl. No. 14/486,995", dated Jun. 14, 2018, 25 Pages.

"Notice of Allowance Issued in U.S. Appl. No. 14/807,807", dated May 9, 2018, 11 Pages.

"Notice of Allowance Issued in U.S. Appl. No. 14/810,144", dated Jul. 24, 2018, 9 Pages.

"Office Action Issued in CN Patent Application No. 201480062689.9", dated Jun. 21, 2018, 16 Pages.

* cited by examiner

OPTIMIZATION OF DATABASE QUERIES VIA TRANSFORMATIONS OF COMPUTATION GRAPH

CROSS-REFERENCE TO RELATED APPLICATIONS

The present applications claims priority from U.S. Provisional Patent Application Ser. No. 62/030,560, filed Jul. 29, 2014, entitled "Machine-Learning-Based Optimization Engine for Pipelined Query Execution in a Distributed Environment", which is incorporated herein by reference.

FIELD OF THE INVENTION

The present technology relates to query optimization. More particularly, the present technology relates to approaches for optimizing queries for execution in a distributed computing environment.

BACKGROUND

Query optimization is typically utilized in relational database management systems for purposes of determining the most efficient way to execute a given query by considering different approaches. Query optimization can be performed after queries are submitted by users to a database server, for example. In some instances, query optimization can involve determining an optimal approach for executing a query based on, for example, accessing the data being queried in different ways, through different data-structures, and in different orders. Each approach for executing a query can require a different amount of processing time. In some instances, processing times of the same query can range from a fraction of a second to hours, depending on the approach selected. Typically, the optimal approach for executing the query is the one that requires the least amount of processing time.

SUMMARY

Various embodiments of the present disclosure can include systems, methods, and non-transitory computer readable media configured to receive at least one database query to be executed. At least one computation graph corresponding to the at least one database query is generated. The computation graph is transformed to an optimized computation graph. The respective portions of the optimized computation graph are distributed to a plurality of distributed computing systems for execution. A result for the at least one database query is provided.

In an embodiment, one or more candidate transformations for the computation graph are evaluated, based at least in part on an objective function, to determine the optimized computation graph.

In an embodiment, a respective cost for each candidate transformation is determined, the cost indicating a respective computational complexity corresponding to the candidate transformation.

In an embodiment, the optimized computation graph is determined based at least in part on the respective costs for the candidate transformations.

In an embodiment, the respective cost for each candidate transformation is determined over a threshold period of time and, upon expiration of the threshold period of time, determining, the optimized computation graph is determined based at least in part on the respective costs for the candidate transformations and on the respective costs for the threshold number of candidate transformations.

In an embodiment, the respective cost for a candidate transformation is based at least in part on one or more of: a cost associated with a node of a candidate computation graph, a cost associated with a portion of the candidate computation graph, or a cost associated with the entire computation graph.

In an embodiment, the respective cost for each candidate transformation is determined based at least in part on an A-star search algorithm.

In an embodiment, the objective function is based at least in part on a weight vector that includes a plurality of weights.

In an embodiment, the weights included in the weight vector are tuned based at least in part one or more machine learning techniques.

In an embodiment, the machine learning techniques utilize Gaussian Processes.

In an embodiment, the weights included in the weight vector are tuned based at least in part weight regularization techniques.

In an embodiment, the weights included in the weight vector are tuned based at least in part on feature hashing techniques.

In an embodiment, the weight vector is automatically tuned based at least in part on respective amounts of time needed to execute one or more queries.

In an embodiment, the method further includes performing adaptive learning by running one or more queries having a less than optimal cost and adjusting, by the computing system, one or more weights corresponding to the weight vector.

In an embodiment, the respective portions of the optimized computation graph are distributed to one or more of the distributed computing systems for which the respective portions are optimized for execution.

In an embodiment, machine-level optimization of the computation graph is performed based on one or more compiler-based techniques.

In an embodiment, an amount of computing resources to be scheduled for executing the optimized computation graph is determined based at least in part on an objective function.

In an embodiment, the method includes determining a pipeline for executing one or more queries, the one or more queries including the at least one database query and optimizing the one or more queries in the pipeline.

In an embodiment, the method includes determining that the pipeline is a repeated pipeline and determining a cache for the pipeline.

In an embodiment, at least one input corresponding to the pipeline and at least one output corresponding to the pipeline are able to be defined using an extended Structured Query Language (SQL).

Many other features and embodiments of the invention will be apparent from the accompanying drawings and from the following detailed description.

Figure 1:
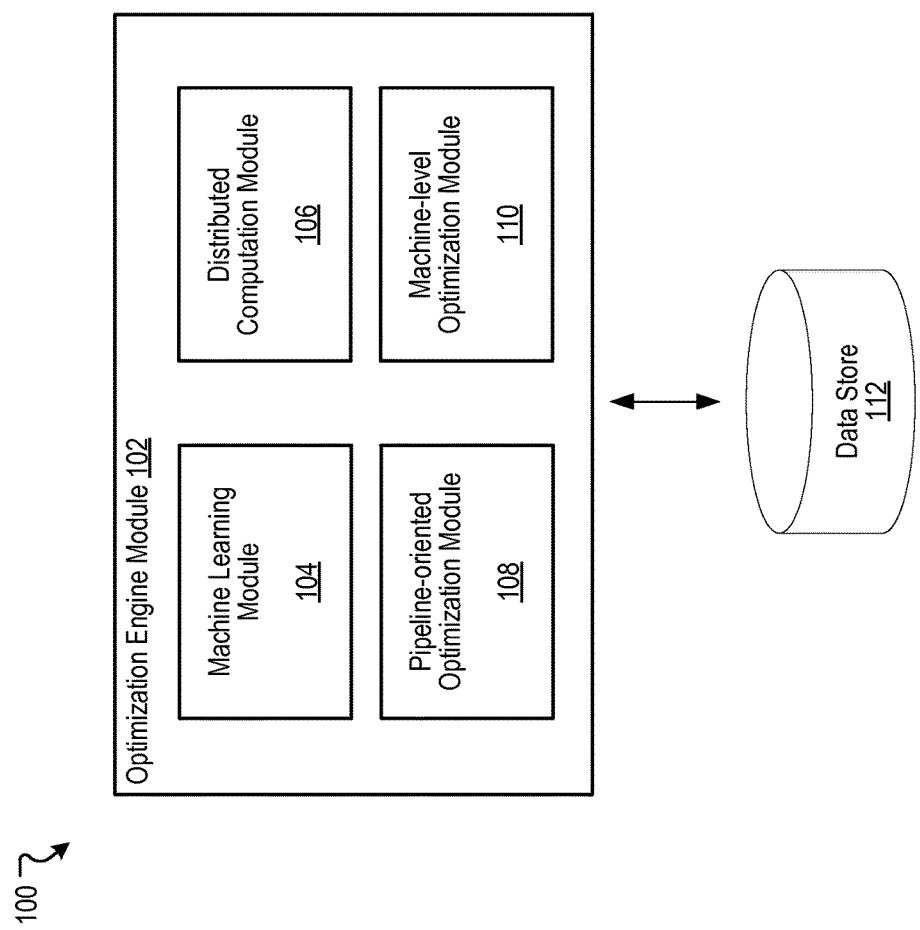
FIG. 1 illustrates an example system including an optimization engine module configured to optimize queries for execution, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Query Optimization Engine

Query optimization is typically utilized in relational database management systems for purposes of determining the most efficient way to execute a given query by considering different approaches. Query optimization can be performed after queries are submitted by users to a database server, for example. In some instances, query optimization can involve determining an optimal approach for executing a query based on, for example, accessing the data being queried in different ways, through different data-structures, and in different orders. Each approach for executing a query can require a different amount of processing time. In some instances, processing times of the same query can range from a fraction of a second to hours, depending on the approach selected. Typically, the optimal approach for executing the query is the one that requires the least amount of processing time.

In various embodiments, the approaches described herein allow optimization and execution of queries. For example, a computation graph corresponding to a query can be determined. The computation graph can be transformed into a set of candidate transformations. Each of the candidate transformations can be evaluated to determine an optimal transformation for the computation graph. The optimized computation graph can be distributed to a plurality of distributed computing systems for execution and a result for the query can be determined.

FIG. 1 illustrates an example system 100 including an optimization engine module 102 configured to optimize queries for execution, according to an embodiment of the present disclosure. As shown in the example of FIG. 1, the optimization engine module 102 can include a machine learning module 104, a distributed computation module 106, a pipeline-oriented optimization module 108, and a machine-level optimization module 110. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the optimization engine module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the optimization engine module 102 can be implemented, in part or in whole, as software running on one or more computing devices or systems, such as on a user computing device or client computing system. For example, the optimization engine module 102, or at least a portion thereof, can be implemented in the SQL-driven distributed operating system 302 of FIG. 3, which may be running on a user computing device or a client computing system. Further, the optimization engine module 102, or at least a portion thereof, can be implemented using one or more computing devices or systems that include one or more servers, such as network servers or cloud servers. It should be understood that there can be many variations or other possibilities.

Figure 3:
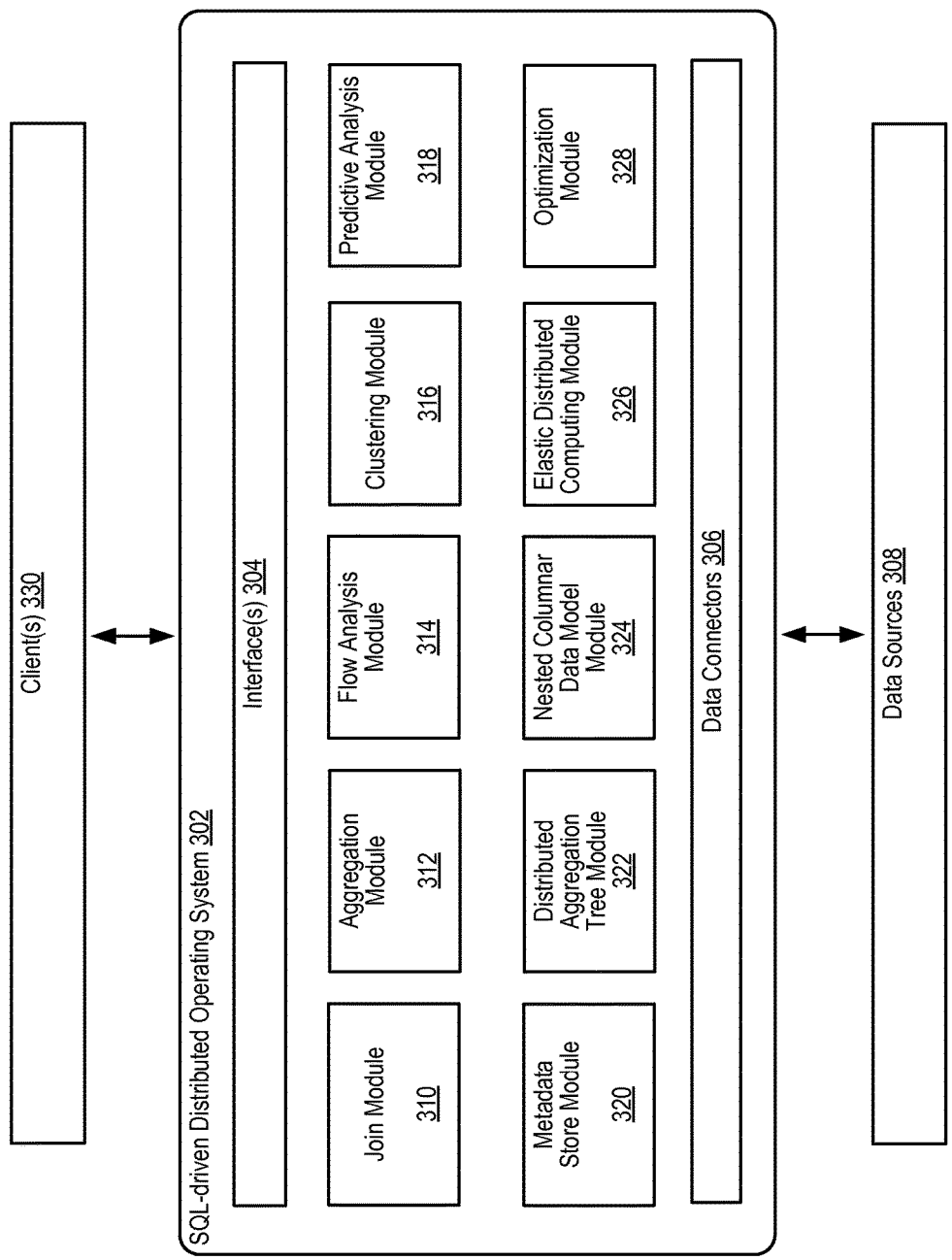
FIG. 3 illustrates an example architecture of an example distributed operating system, according to an embodiment of the present disclosure.

In various embodiments, the optimization engine module 102 in conjunction with the SQL-driven distributed operating system 302 of FIG. 3 can be utilized to allow users to fetch, transform, save, and generally manipulate data on a variety of platforms including, cloud computing systems or platforms, relational database management systems (RDBMS), and NoSQL database systems (e.g., document-oriented databases, for example. In various embodiments, a user can define the desired result in SQL. A key component in producing this desired result is the formulation of the computation in a way that permits efficient utilization of resources. The optimization engine module 102 can be a component that makes transformations to a computation graph. An input to the optimization engine module 102 can be a computation graph and the output from the optimization engine module 102 can be an optimized computation graph.

A computation graph can be a graph of dependencies which fully describes a computation to be executed. While the approaches described herein are not limited to SQL queries, a typical application of such approaches is to represent one or more of SQL queries into a computation graph which realizes or captures a user's intent. In various embodiments, the role of the optimization engine module 102 is to transform one computation graph to another computation graph that can be executed more speedily and/or use fewer resources. Such transformations can include, but are not limited to, the choice of an algorithm, parameters to run an algorithm, and the order and/or sequencing of algorithms to apply.

In various embodiments, the optimization engine module 102 can perform operations that are more advanced than conventional optimizers in several aspects. For example, the architecture of the optimization engine module 102 can be configured to apply advanced machine learning techniques. In another example, the scope of the optimization engine module 102 can be expanded from a single-thread, single-query optimization to running multiple queries on a distributed computation environment (e.g., multiple threads on multiple machines), across time. Further, optimization engine module 102 can be configured to utilize Just-In-Time (JIT) code generation techniques.

In various embodiments, the machine learning module 104 can be configured to determine, for a given query, transformations that can be applied to the query to yield an optimal (e.g., fastest) computation graph. More details regarding the machine learning module 104 will be discussed in reference to FIG. 2.

The optimization engine module 102 can also include a distributed computation module 106 that can be configured to distribute query computations. Most query optimizers are typically designed for a single computing system, or machine, environment. Typically, the query execution does not take into account multiple threads. However, in Big Data environments, processing is generally distributed across multiple machines and on different threads. In various embodiments, the distributed computation module 106 can natively optimize (if needed) query execution, or computation, for multiple machines and different threads, thereby making the best decision about where to lay the machine boundaries to minimize I/O, take into account machine capabilities, etc. Moreover, the distributed computation module 106 may choose distributed algorithms such as "shuffle", to re-organize the data during a query. For example, an objective function can be utilized to evaluate candidates that may be generated, for example, by a candidate generator. The objective function can be used to determine whether a candidate is good. Further, the candidate generator can generate plans that correspond to different variants. For example, a plan may dictate that a part of the query be executed on a single thread. The optimization engine module 102 can generate candidates to be run on different machines, with different threads, and then determine whether or not to take that route. In some embodiments, the process can start with a single machine and/or single thread, followed by the generation of candidates, evaluation (e.g., compute the objective function), and then comparing the objective functions. In some instances, the objective function can be a cost function and, in such instances, a lower cost is preferable. If the candidate with multiple threads is worse off, then multiple threads are not generated. This can occur, for example, if the overhead of having multiple threads outstrips the gain in speed. The overhead might be thread startup cost and additional costs involved in merging results across threads, for example. The same reasoning applies for multiple machines. For multiple machines, the merging of the results implies some network I/O to transmit intermediate results between machines.

In some embodiments, the distributed computation module 106 can determine if such optimization is needed by generating all possible candidates and computing the cost function for each of them. The plan having the smallest cost can then be selected. To avoid generating all possible candidates and their respective costs, an approximate solution can be determined, for example, using the A-star algorithm, as described in the present disclosure. In turn, the cost function is computed from the weight vector. The weight vector can be learned from data and can indicate, based on its experience, what are the best tradeoffs.

For example, say a determination is being made as to whether to use one or M machines for a particular query. A determination can be made that X bits out of the hard drives need to be fetched (assuming that the data are in both machines), perform some computation that results in Y bits, then combine the results into the final result Z. The objective function might be, in each case (a) single machine, and (b) M machines. In this example, the weight vector is $w1, w2$, etc. (each wk is a real number, e.g. 25.5 etc. The cost to read from disk can be: (a) $X*w1$, and (b) $(X/M)*w1$: because each machine reads only X/M of the data. In this case, $w1$ represents the speed of the hard drive. The system can compute from $X \rightarrow Y$: (a) $X*w2$, (b) $(X/M)*w2+Y*w3$. In both cases, the output Y is the same (as would be the case for a GROUP BY, for instance). In that case, w2 represents the computation on X, and w3 represents, say, the time it takes to encode and compress Y to make it ready for transmission. For the single machine, we don't actually compute Y, so we skip that step. The bits can be sent over to a single machine to merge results: (a) 0, (b) $Y*(w4*N)$. Here, w4 represents network I/O (assumed to be limited on the receiving machine). The results can be combined: (a) $X*w5$, (b) $Y*w6*N$. In this example, we have two different computations to do, either on a single machine or on multiple machines. Although this is a simplified example, it shows that if you plug in the numbers estimated from the query to run (X, Y), and from the model (the weight vector $w1, w2, \ldots$), then you get two different costs. If Y is very large (or w6), then it is not worth the effort splitting the query to many machines. On the other hand, if w1 is very large (a lot of computations with a relatively small result), then it is better to send to multiple machines.

In various embodiments, the distributed computation module 106 can make the best decision about where to lay the machine boundaries to minimize I/O. For example, in the query above, we had three parts, X, Y, and Z. But we could decide to run the query in a different way. Say we have a query that can be executed in five stages, S1, S2, S3, S4, S5. We could decide to run the stages (S1, S2) on machines M1, and M2, then (S3, S4) on M2, then S5 on M1, M2. That is a good decision if the output of (S1, S2) is pretty small, and (S3, S4) is also pretty small, and S5 is a highly computationally demanding task (or may require resident memory that exceeds the capacity of any machine). As used herein, "machine boundaries" can refer to what runs where, so the cut off points and their association as above (S1, S2) running on M1, M2, etc. are the machine boundaries.

The optimization engine module 102 can include a pipeline-oriented optimization module 108 that can be configured to optimize query pipelines. Generally, most query optimizers are designed with a "single-shot", single query in mind. However, in many organizations, there is a need to run a pipeline (e.g., multiple queries) which may take a long time. In various embodiments, the pipeline-oriented optimization module 108 can be configured to facilitate such pipelines. For example, the pipeline-oriented optimization module 108 can extend the SQL language with pipeline elements that permit better dependency graph analysis, and therefore parallelization. In another example, the pipeline-oriented optimization module 108 can be configured to optimize some, or all, queries in a pipeline in a single shot, thus making a global decision. In another example, the pipeline-oriented optimization module 108 can be configured to optimize execution for repeated pipelines (also with proper sampling, as described in reference to FIG. 2), by creating appropriate caches. The process of optimizing execution for repeated pipelines by creating appropriate caches is sometimes called intermediate materialization. Say you have to run a pipeline that loads up data from table A, then joins it with table B. Both of them are somewhat large. Say you have to run the pipeline multiple times, but you know that each time, only A changes, but never B. So you load up B in memory (cache it), so that once it's cached, then you can run the pipelines faster. If you know it is a one-time affair, however, you discard B from memory as soon as the pipeline finishes (as A).

On the language side, tables can be defined as input and output parameters to a pipeline, therefore making it easier to analyze and minimize side effects. For instance, a pipeline may be defined with:

```
CREATE PIPELINE MyPipeline WITH
    CountryRevenue INPUT,
    ContinentRevenue OUTPUT
``` which can make it easier to delineate inputs and outputs from a pipeline.

The example above (i.e., CREATE PIPELINE syntax) is an example of extending the SQL language and therefore parallelization. This example uses the declarative nature of SQL to help the system know what the inputs and the outputs are to a pipeline. That simplifies the dependency graph analysis. The dependency graph analysis helps parallelization as follows. Imagine you have a combination of pipelines P1, P2, P3. You say: Run P1, P2, P3. You want to know if you can run P1, P2 in parallel, then P3, or all three in parallel, etc. The way you know that is via dependency graph analysis. The dependency graph dictates that, for instance, P2 needs P1 output to run correctly. For instance, P1 generates a table that P2 uses. Say, P3 is not dependent on anything, so you have the choice to run the declared sequence P1, P2, P3 as follows: 1) Run (P1 then P2) in parallel with P3, or, 2) Run P3, P1, P2 sequentially, or, 3) Run (P3, P1) in parallel, then, when P2, etc. The way syntax helps dependency graph analysis is as follows. P1 would declare table A to be its output, and P2 would declare A as its input. P3 would be unrelated to input or output tables of P1, so we know it's safe to run. (This is sometimes called "no side effect".)

In some embodiments, queries can be optimized in a single shot. For example, most optimizers run optimization on one query at a time, and at best a single execution unit (within a pipeline). Considering the graph formed of all instructions required to realize P1, P2, P3, as a whole, permits better optimization. That is what we mean by a single shot. That is also global optimization.

With respect to making a global decision, It is usually meant global as opposed to local. Say, in the example above, you have to run two queries Q1 and Q2. Knowing that you want to run them in parallel might alter the way you run them. For instance, we know that if a query were to run in isolation, it is almost always better to run it using operators that use memory, rather than disk (example: sort in memory is much faster than sort from disk). However, if Q1 and Q2 do not both fit in memory, you can run Q1 in memory, and Q2 on disk (meaning, Q1 using mostly memory-based operators, and Q2 using mostly memory-based operators).

The optimization engine module 102 can include a machine-level optimization module 110 that can leverage compiler technology, for example, when Just-In-Time (JIT) code is being compiled for a query. The leveraged compiler technology can include, but is not limited to, loop-invariant code motion, inlining, and constant folding. In various embodiments, the computation graph can have fine granularity. In such embodiments, register allocation is not needed and, instead, compiler technology can be utilized to perform the final stage of machine-level optimization. For example, compiler technology (e.g. LLVM) can be used to perform low-level optimizations that are tailored to the machine on which the query runs. Some examples of such optimization include register allocation and use of special instructions (SIMD, GPU, encryption). For instance, a for loop might be re-written as a single SIMD instruction, if a machine is endowed with a CPU that supports SIMD instructions. Because the code generated is dynamic, the whole optimization process guarantees that execution will be optimized up to the machine level.

It is noted the components shown in this figure and all figures herein are exemplary only, and other implementations may include additional, fewer, integrated, or different components. Some components may not be shown so as not to obscure relevant details.

Figure 2:
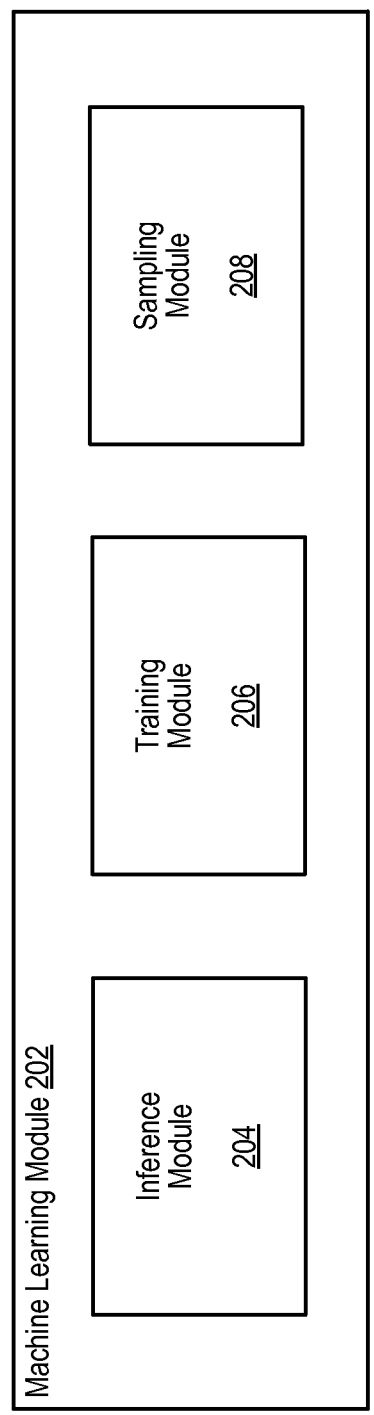
FIG. 2 illustrates an example machine learning module configured to optimize queries for execution, according to an embodiment of the present disclosure.

FIG. 2 illustrates an example machine learning module 202 configured to optimize queries for execution, according to an embodiment of the present disclosure. As shown in the example of FIG. 2, the machine learning module 202 can include an inference module 204, a training module 206, and a sampling module 208.

In various embodiments, the machine learning module 202 is configured to optimize query execution using various machine learning techniques. These techniques can involve an inference stage that, for any given query, determines how to search efficiently through a space of possible combination of transformations to identify which transformations will yield the fastest computation graph when applied. The techniques can also include a training stage from which the machine learning module 202 can learn various information and/or metrics from running queries in a computing environment. Moreover, the techniques can also include a sampling stage which involves determining how to write computation graphs which, as queries are executed, allow the machine learning module 202 to collect the most information to be used for training a computing system (e.g., learning to learn).

In conventional query optimization, the inference stage is typically fulfilled by so-called cost-based optimizers. In various embodiments, the inference module 204 can be significantly more general than the cost-based optimizer. This is the "runtime" function of the inference module 204. For example, the inference module 204 will notionally consider transforming the computation graph using the first transformation. There are multiple transformations to be applied, so the inference module 204 will keep the most promising candidates. To evaluate which transformations are the most promising, the inference module 204 can use a proxy objective function, which is a mathematical function which evaluates a computation graph into a single real number. That number, or cost, is a proxy for how expensive the query is estimated to be. The objective function is based on a set of other parameters, called the weight vector. After the first transformation is applied, then another transformation may be considered. Each candidate transformation will be considered to produce another set of candidates. All transformations will be evaluated and only the most promising transformations will be kept. The process is repeated until we are satisfied with the result, either because we run out of time (e.g., threshold time period), or because transformations no longer lead to a reduction of the objective function.

The process just described may be achieved using various algorithms, such as A* search algorithm or dynamic programming. When applying such algorithms, there arises the question of whether two series transformations lead to the same graph (commutativity, involution, and associativity rules). This is guided by the functional form of the objective function. Unlike conventional algorithms, the objective function need not be hand-crafted. Rather, the search process is general and need not be tailored to the transformations at hand. For instance, one might frequently find a "join order optimization" algorithm within a cost-based optimizer, combined with heuristic transformations. In various embodiments, the inference module 204 is configured to apply an algorithm that is unified and tackles both with a generic objective function.

As an example, a computation graph can be referred to as a skeleton and each node in the graph can be referred to as a bone. The skeleton may be produced, for example, by a query compiler. In various embodiments, the inference module 204 can transform the skeleton into another skeleton that still provides the same results but putatively faster. The specific parameters that go into the cost function are optimized using a Gaussian Process regression and MCMC loop, as described below.

The algorithm performed by the inference module 204 is designed with specific ideas in mind. For example, the algorithm may optimize multiple queries, the algorithm may run the optimization (e.g., through the optimization engine module 102 of FIG. 1) in parallel, the algorithm may perform flexible machine-learned cost functions, and the algorithm may operate with low latency and no inline sampling. In various embodiments the inference module 204 applies the A* (A-star) algorithm.

Inference Algorithm—Definitions

In describing an example application of the A* algorithm, the following information is assumed. A bone is denoted b. It is a tuple containing an operation o, operation parameters c, and a type t, and an id also denoted b, for the purpose of distinguishing bones with the same parameters.

A skeleton is denoted S. It is a pair containing a set of bones {b}, and one-to-many bone mapping relationship i, mapping a bone to their respective inputs. In some embodiments, i is closed in S. The relationship returns an ordered sequence of bones. The skeleton is a fully connected directed acyclic bone graph. The sinks of the skeleton are bones which are inputs to no other bones, denoted O(S). The sources of the skeleton are bones which have no inputs, denoted I(S). The input graph of a bone b in S, is denoted $I_s(b)$, or I(b) for short. It is the transitive set of all bones who are inputs of b, or inputs to inputs of b, etc. Because we can apply I, it is thought to be a graph, not just the set. The input graph is a skeleton.

A transformation pass is denoted p(S). It is a one-to-one mapping in the universe of skeletons. All our transformation passes are such that the skeleton realizes the same function (same SQL output) after the transformation is applied. For readability, we may write pS to mean p(S), and $p_1 p_2(S)$ to mean $p_1 (p_2(S))$. The allowable support of p, is potentially large. The set of those at our disposal (implemented) is called the vocabulary of transforms, denoted P. A cost function J(S), which denotes the estimate cost of running the skeleton. Typically, this would be some combination of a) time it takes to run the query, b) computation cost, and c) sampling diversity cost. It is potentially expensive to compute. The act of computing a concrete value for a given skeleton is called "scoring" a skeleton. A heuristic cost function H(S), which is an approximate (or bound) on the cost function. It is critically important that H(pS) may be written with explicit construction of p(S). Ancillary information used to compute the cost function is denoted $A_j(S)$. These sufficient statistics are enough to compute the cost function, without looking at S or its bones. Two skeletons $S_2$ and $S_2$ are considered equivalent iff (if any only if) they are equal up to bone numbering (bone id). Two skeletons $S_2$ and $S_2$ are considered equipotent under J iff (if and only if) for all p, $J(p(S_1))=J(p(S_2))$. Denote S*, the skeleton with the minimal cost under J, given our vocabulary of transforms. It is the ultimate goal, but usually unknown.

Further, i describes an acyclic mapping. That is, $I_s$ (b) does not contain b. The heuristic and actual cost functions have the same functional form (normative assumption). For all intents and purposes, we assume that J(S) is exact and it is the ultimate goal of inference. Input subgraphs may overlap. Equivalent skeletons are equipotent. Given a finite vocabulary of transforms, the costs might not be monotonic. That is, there not exist such a set of transforms $\{p_k\}_k$ such that: $J(S)>=J(p(S))>=J(p_1 p_2(S))>=J(p_1 p_2 p_3 (S))>= \ldots$, however $J(S)>=J(p_1 p_2 p_3 (S))$. That is, we may have to temporarily accept an increase in the cost function to obtain an optimum. It is usually unknown what the optimal cost is, or how far we are from the optimal cost. The cost is a prediction of how expensive running the query is. It is not the true expense. The definitions are somewhat redundant, and contain pre-computed information.

Inference Algorithm—Examples

An example b might be an addition node. It takes inputs from all of its inputs, and numerically adds their results. A bone of that type, though with different IDs, will appear multiple times in. A skeleton would normally minimally contain an input bone from which the input table is read.

A "SELECT a FROM T WHERE a<10" command may consist in: A scan bone $b_1$ which returns the entire contents of T, row by row. A project bone $b_2$, connected to $b_1$. In other words, $i(b_2)=\{b_1\}$. This extracts the column named "a" from the whole input row. A comparison bone $b_3$, which returns the result of the comparison of its input to the number 10. A filter (selection) bone $b_4$, connected to $b_2$ and $b_3$. Note that the order in the inputs matter. The filter takes the results of the comparison, and discards all entries for which the comparison is either NULL or FALSE. In that skeleton, the input subgraph of the filter bone is the entire skeleton. The input subgraph of the comparison is $b_2$ and $b_1$.

A cost function might be as follows. It would know that the table T is stored on S3, and is 3 GB. It could then estimate a retrieval speed for the node b1. It would also have access to a histogram of the column "a" (so-called selectivity of the filter). (In that case, because there is no further processing, it would not really enter in the cost of this skeleton. One may introduce a "marshalling" bone, which packages the output for presentation to the screen. That would have a cost roughly proportional to the expected input.)

A typical set of ancillary information is the cost of the input graph for each bone, along with its selectivity. The cost function may then be constructed by adding the cost with the incremental cost given the selectivity. Another typical piece of information is whether a specific transform was already applied, for instance, filter pushdown is typically applied only once.

Inference Algorithm—Outcome

With respect to the outcome, given a skeleton S and a vocabulary of transforms, each of which may be applied zero or more times, we seek to find a skeleton with the smallest cost possible by applying the transforms.

Inference Algorithm—A-Star Search

Regarding the A* (or A-star) search, we run the A-star search algorithm, which works as follows. Notionally, applying a cascading set of transforms to a skeleton, we need to entertain a set of skeletons simultaneously to find which one is the best. Each transformation of a skeleton in the set of possible skeletons that we have scored is called a candidate. We keep extending the set of candidates and score them with the heuristic function. We pick the most promising ones at any point. The candidates which may in the present or future be considered promising are called "active".

The basic algorithm works as follows:

Step 1. Start with the compiled skeleton as the only active candidate.

Step 2. From the list of applicable transforms, score the possible extensions. Do not create the candidate skeletons yet. Discard equipotent extensions that have been already seen.

Step 3. Pick the most promising candidates according to the heuristic function.

Step 4. Apply the transformation to materialize the candidate. Compute its actual cost.

Step 5. Go to step 2 unless a stopping criterion was met.

The stopping criterion typically is a threshold of potential decrease of cost, number of transformations applied, or time already spent exploring (e.g., threshold time period). (The latter one is non-deterministic.) In multiple threads, we would expand multiple candidates at a time. This is heuristic. A typical simplification is to use equivalence instead of equipotence.

Inference Algorithm—Implementation

This work is recycled across these passes. A lot of the expense arises in three areas:

1. Creating new skeletons (applying transforms).
2. Scoring candidates under the heuristic function, and under the cost function.
3. Merging equipotent duplicates (equipotence testing).

Therefore, to implement the algorithm well, the following parameters are studied:

Functional form of the cost functions.
Sharing structures across candidates.
Sharing ancillary information across cost functions.

To understand how the functional form of the cost function affects the search, let us consider the following cases. First, let us imagine that we have the data in multiple locations. Given the current set of available machines, we know that a location is preferable to another. So, we may transform the input bone to read from the faster location. The difference in cost of this transformation is independent of whatever happens in the rest of the skeleton. Also, it does not affect any cost in the rest of the skeleton. It is very easy to apply. By contrast, join order is more difficult.

Inference Algorithm—Functional Form of the Cost Function

Regarding the functional form of the cost function, the cost function is the linear juxtaposition of three kinds of components:

1. Atomic: the cost depends on the bone only.
2. Linear: the cost may be constructed from the input subgraph, and added.
3. Global: the cost requires the entire view of the skeleton.

The "global" cost can be expensive and should be used sparingly.

An example of an atomic cost is cost of JIT. It doesn't depend anything but the code size of the operator. Most functions are typically linear. That allows for the most efficient tradeoff of ease of implementation, efficiency, and expressive power. A transformation may touch one or more components of the cost function.

All components may have associated sufficient statistics, $A_f(S)$.

We now turn to describe the function more precisely and how they relate to the sufficient statistics. Let's imagine a purely atomic cost function. It would be written as:

$$J(S):=\Sigma_{b \in S} j(b),$$

where j(b) is a function which only depends on b.

The linear component cost model is as follows:

$$J(S):=\Sigma_{b \in S} j_s(b).$$

Now, the which is added per bone has a special structure:

$$j_s(b):=j_{I(b)}(b).$$

In other words, the cost may be computed by just looking at the subgraph under the bone. Moreover, by definition of sufficient statistics, A satisfies:

$$j_{I(b)}(b):=j_{A(I(b))}(b).$$

And A may be recursively constructed by just looking at the subgraph as follows:

$$A(S):=U_{b \in O(S)} A_S(b),$$

with $$A_S(b):=A(b) \cup A(I_S(b)).$$

A good example is the "selectivity". The selectivity of a node is the amount by which a node reduces the amount of input. An example is the filter node, which discards data based on some condition. If the condition is stringent, then a lot of data will be discarded. Thus, A would be the estimated amount of data at each node.

Inference Algorithm—Incremental Computation

Searching through the possible set of all candidates is expensive. This is why we have taken care to constrain the shape of the cost function and ancillary functions. Thus, in various embodiments, incremental computation is performed. Incremental building is done by traversing the skeleton and updating structures as we go.

Inference Algorithm—Candidate Merging

One question that arises is when two skeletons are equipotent. In that case, we must only keep a single candidate. Here, we simplify to only consider the case of equivalence, since equipotence requires tight coupling with the cost function. Currently, we use hashing of the skeleton. That is an expensive operation. Because most transformations operate on a subgraph, we keep the hashes around for all possible subsets (one for each bone, representing the hash of the subset). In other words, the hash is a like a linear cost function with a different semiring. The equivalence might lead to overgeneration of the search space. Thus, we provide a virtual function call which may be customized.

As mentioned the machine learning module 202 includes a training module 206 that can be configured to train a machine learning model. In a conventional system, the weight vector underlying the objective function is determined empirically, or worse, set to an arbitrary "good" value by the system programmer. Values are typically determined and set in isolation, or in small groups of two or three.

In various embodiments, the training module 206 can be configured to determine the weights jointly. That is, the best set of values together is evaluated by observing the results of running multiple actual queries, with multiple variants of computation graphs. The weights are tuned, using a machine learning algorithm, such as gradient descent with Gaussian Processes, so that the combination of weights which gives the most accurate results is selected. In some embodiments, weight vectors can be adaptively optimized based on the amount of time used to execute one or more queries. For example, as we run the queries, we watch how long they take, and then we can adjust the weight vector. Such adaptive adjustments may be needed based on nuances of the environment being utilized. For instance, a customer might have a disk (e.g., a fast disk, such as FusionIO) that was not evaluated during training of the weights, because such a disk was not available. So, our weight vector might systematically over-estimate the cost to run from disk. Over time, the weights would be automatically adjusted downward.

Moreover, our configuration of the weights is entirely generic, so we may factor weights to be make them most amenable to Bayesian optimization (also called weight regularization) and feature hashing, both of which are again beyond conventional training approaches.

Because the objective function can be set to be a proxy for runtime, so as a byproduct its output may be used to drive scheduling requirements. That is, prior to running a query, we have an estimate of how long the query is going to take so that we may schedule computing resources appropriately. This is especially useful for scheduling batch pipelines.

As mentioned, in various embodiments, the inference module 204 can be utilized to optimize the specific parameters that go into the cost function using a Gaussian Process regression and MCMC loop. In some embodiments, the approaches described herein can utilize active learning in terms of query execution. For example, occasionally a determination may be made to not run the query with the smallest cost. Instead, a query that is slightly different may be run, but would give some information about the system, so that better decisions can be made in the future. For instance, imagine that we have just two queries running on the system, Q1 and Q2. Given our current set of weights, we determine that it is always better to run Q1 and Q2 sequentially, from memory. In this example, we would not touch the disk and we would not know how fast the disk actually is. So, every once in a while we would decide to do the "wrong" thing by executing Q2 from disk. If the disk is fast, we might learn that it is better to run Q1 in memory, and Q2 in parallel from disk.

Gaussian Process Regression and Hyper-Parameterization

In various embodiments, the parameters of the cost function are optimized using Gaussian Process (GP) regression. Therefore, it is important to keep a register of those. Because the engine is evolving, some variables may enter and exit the set of regression variables. GP regression can be applied using generally known techniques.

The GP regression will answer the question of how to set hyper parameters of the cost function. Consider a simple cost component: the JIT cost. How much time should we account for that? This depends on the wide variety of hardware that we may run on. It may differ depending on the difficulty of the code encountered in the bone. So, we may parameterize this as a vector of weights: cost of each bone type. The cost might be the dot product of the indicator function of the bone identity and the costs. So, there would be a cost to learn for each bone. So a determination is made to see how all nodes perform at least once to measure the cost. That is the most exact, but requires more data. There is one weight for each bone. Moreover, if a new bone is created, the regression is performed, or run, again. If the bone is modified, the inference module 204 will work on stale data. An intermediate tradeoff is to look at the size of the bitcode, and the bitcode library modules. In that case, the most accurate measurement may not be determined but such measurement would be reasonably close. This will work for all bone types, seen and unseen. This is the preferred route. The technique of getting an explicit model is called "lexicalization"—in speech and language statistical processing, that would refer to having a specific model for a given word. It is always the most accurate model when plenty of data are available. For this reason, it is usually "blended" with the basic model with some "regularization" weight (diffidence score). The machine learning algorithm naturally learns to use the lexicalized model, if it is useful, with a lot of examples.

Gaussian Process Regression and Hyper-Parameterization—Factoring

One common case is one where we would bundle several transformations together into a single unit. This is useful for efficiency, and somewhat reduces the search space. The code should allow efficient combination (i.e., the output of a transformation pass should be able to serve as the input of another transformation pass). That may only be available in some cases. For instance, the inference module 204 may be able to compute $H(p_1 p_2 S)$ without computing $p_2(S)$, but not in all cases. Otherwise, there is no special handling in the search algorithm. The combined transform should have a delta cost which is higher than either of the transforms and be prioritized appropriately.

Gaussian Process Regression and Hyper-Parameterization—Hard-Wiring

One special case of a cost/transform is one where we "know" that it is the right thing to do, and that it must be applied unconditionally. This may be forced by modifying the cost function, or applied in the beginning, prior to the search. In the latter, it is possible to apply the transform for cases which were not present in the beginning. For instance, it is known that predicate pushdown is nearly always good to do. During the course of the transformations, the inference module 204 may determine that it may beneficial to apply that transform again.

The machine learning module 202 also includes a sampling module 208 that can be configured to sample data. Under conventional approaches, one assumes that the training data (in that case, queries running with multiple execution plans) is of reasonable size, and that it is produced before any training takes place. We apply more advanced machine learning techniques, to sample, during training, what data needs to be collected, i.e., which queries with which computation graphs need to be run, so that the sampling module 208 may learn the most from running queries with each query. The approaches described herein are not limited to a particular technique. In some embodiments, Monte-Carlo Markov Chains in combination with Gaussian Processes, which is a well-studied field, may be utilized. With this technique, we may achieve the best tradeoff between running our deemed most efficient computation graph versus one which would achieve reasonable speed, but collect information which allows us to run subsequent queries faster.

FIG. 3 illustrates an example architecture of an example distributed operating system 302, according to an embodiment of the present disclosure.

The example distributed operating system 302 can include various interfaces 304. Such interfaces can include, for example, client-side data connectors (e.g., ODBC, JDBC, Odata connectors). For example, various clients 330 (e.g., software-based clients) running on computing systems can be utilized to interact with the SQL-driven distributed operating system 302 through the interfaces 304. Such clients 330 can include, for example, an SQL client (e.g., workspace), data visualization clients, integrated desktop environment (IDE) clients, statistical analysis clients, spreadsheet clients, business intelligence tools, etc. The SQL-driven distributed operating system 302 can also include data connectors 306 which can facilitate connections to external data sources including, for example, Lightweight Directory Access Protocol (LDAP) servers that can be used, for example, to authenticate users of the SQL-driven distributed operating system 302. The SQL-driven distributed operating system 302 can also connect data sources and/or data sinks using the data connectors 306.

As mentioned, users can interact with the SQL-driven distributed operating system 302 through one or more clients 330. Through the client(s) 310, users can submit SQL commands to configure, or operate, the SQL-driven distributed operating system 302. As mentioned, these SQL commands can be issued through the interface 304 and the SQL-driven distributed operating system 302 can be configured to provide responses to the SQL commands to the client(s) 310 through the same interface 304. Such responses may include retrieved data, status messages, and/or error messages, for example.

In various embodiments, the SQL-driven distributed operating system 302 can include a metadata store module 320 that can be configured to retain various information including, for example, data sources and data sinks (e.g., database table definitions), other SQL entities defined by users in the course of using the SQL-driven distributed operating system 302 (e.g., views, functions, etc.), scripts (e.g., scripts including SQL statements), security information (e.g., users, user access rights, roles, passwords, etc.), activity logs (e.g., login/logout activity, queries previously executed through the SQL-driven distributed operating system 302, etc.), configuration parameters (e.g., a flag indicating whether experimental features are enabled or disabled), dynamically deduced information about the SQL-driven distributed operating system 302, and any related data (e.g., range of values for a column of a database table; network state, speed, and/or other characteristics; etc.).

The SQL-driven distributed operating system 302 can include a distributed aggregation tree module 322 that can be configured to efficiently aggregate data across multiple compute nodes. For example, when computing the sum of a column across two million rows, stored in two shards of one million rows each, the distributed aggregation tree module 322 can utilize two leaf nodes in the aggregation tree, one per shard, to compute the sum for each shard. A third (root) node, together with parent nodes of the leaf nodes, can be utilized to compute the final sum of the two sums corresponding to the two shards. Sharding is a type of database partitioning that separates very large databases, or tables, the into smaller, faster, more easily managed parts called shards or data shards.

The SQL-driven distributed operating system 302 can include a nested columnar data model module 324 that can be configured to support columns whose type is not a scalar traditionally found in databases, but is, instead, a complete object with multiple fields, which may be scalars, other objects, or arrays thereof. Moreover, the nested columnar data model module 324 may store data in such table columns by storing values across all rows for one field in one block, followed by values across all rows for the second field in a second block, and so on, to generate the nested columnar model. This nested columnar model is in contrast to a row-oriented model where values for all columns and fields in one row are stored in one block, followed by values for all columns and fields in a second row stored in a second block, and so on.

The SQL-driven distributed operating system 302 can include an elastic distributed computing model module 326 that can be configured to execute computation in a distributed fashion based, in part, on a generalization of Distributed Aggregation Trees. The elastic distributed computing model module 326 can be utilized to use more or less compute nodes, as necessary, for the specific computation at hand. For example, a simple addition of two numbers may use a single compute node, while computing the logarithm of every value in a single column of a table with a million rows may engage multiple nodes to process different portions of the table concurrently. This distribution of workloads among compute nodes can be determined based on the computational complexity of the workload and/or the availability of compute nodes (e.g., the number of available compute nodes, the system resources available (e.g., CPU, GPU, memory, etc.) for the compute nodes, etc.).

The SQL-driven distributed operating system 302 can include an optimization module 328 that can be configured to enhance or fine-tune the manner in which queries are executed so that their performance is aligned with the end-user's needs. This can include, for example, simple, traditional techniques (e.g., query rewriting), as well as more complex techniques that accommodate a variety of business needs and context (e.g., ad hoc systems for interactive query issuance and experimentation, batch systems for massive data analysis without interaction, or training sessions where accuracy is secondary to consistency to prevent trainee confusion). The optimization module 328 can use both static information (e.g., the query text and explicitly specified priorities) and dynamic information (e.g., statistics on tables collected from prior queries, network state of data source replicas, etc.) to perform the optimization.

Further, with respect to the optimization module 328, the notion of optimization can extend well beyond traditional query optimization. The optimization of SQL command execution can involve in part the following techniques, as well additional ones (of a deeper technical nature). One example optimization involves traditional query rewriting. For example, the filter x>20 AND x>10 can be simplified to x>20. Another optimization can utilize other traditional techniques, such as caching of frequently used data.

The optimization module 328 can also provide novel extensions of traditional techniques. For example, computer programs expressed in high level languages, such as SQL, are typically executed using one of the following processes to translate the source program into executable native code. One example process involves one-time compilation in which the whole program is translated into a native code representation, and then the latter is executed. Another example process involves interpretation in which an interpreter executes (interprets) one high level instruction, or part thereof, at a time by executing the native code representation of that instruction, and where that native code representation is fixed for each high level language instruction, and embedded within the interpreter. Another example process involves Just-in-Time (JIT) compilation in which an interpreter executes (interprets) one high level instruction, or part thereof, at a time by executing the native code representation of that instruction, unless a sequence of instructions that are executed very regularly is encountered (hotspots), and which the interpreter then translates into native code en mass such that the whole program is translated into a native code representation, and then runs that native code instead of interpreting the individual instructions in that sequence.

In various embodiments, the optimization module 328 uses a variation of JIT. For example, the optimization module 328 can translate every query, however complex it may be, into a single native code representation for the whole query, thus enabling the optimization module 328 to apply many well-known optimization techniques across different parts of the query, such as register allocation, loop unrolling, inlining, and constant folding. In a sequence of queries, the optimization module 328 translates and optimizes one query at a time in a pipelined fashion, e.g., while the first query is executing, the second query is being translated and optimized. The optimization module 328 also uses innovative techniques so that the single native representation resulting from the above translation and optimization is parameterized in a manner that the same representation may be invoked to process different shards of a data source (e.g., each shard may need different parameter values, such as the name of the file containing the shard).

Another optimization involves support for advanced features of standard SQL. For example, if unrelated queries Q1 and Q2 must happen after a row has been inserted into a table T, then using traditional procedural/imperative programming, a user may express that dependency using a hypothetical expression similar to:

IF INSERT(T) THEN {Q1; Q2}

That expression, however, doesn't just specify that Q1 and Q2 should happen, it also specifies that Q1 should happen first and Q2 should happen next. This unintentional side-effect is eliminated if the user uses SQL triggers, which, being part of the SQL language, follow its functional/declarative paradigm: the optimization module 328 may then choose to execute Q1 and Q2 concurrently.

In some embodiments, the optimization module 328 extends storage of data accessed by queries in formats that are optimized for efficient retrieval, based on user hints or actual usage patterns. For example, use of column-oriented formats instead of row-oriented formats, or sharding of data across the compute nodes of a multi-compute node installation of the SQL-driven distributed operating system 302.

In some embodiments, the optimization module 328 can utilize user-specified information regarding the data sources and data sinks. For example, based on user-specified information indicating that database R is a replica of a primary database P, the optimization module 328 can obtain the same data from either P or R at the discretion of the optimization module 328.

In some embodiments, the optimization module 328 can utilize dynamically-deduced information regarding data sources and sinks. For example, the optimization module 328 may deduce from past queries that a table's age column contains values which range from 0 to 110 even though the type of that column is an integer capable of representing a much larger range; therefore the shards of this table should not partition the full integer range in equal-sized buckets, but should partition the range 0-110 instead (making an allowance in the edge buckets for negative values and values exceeding 110, should they appear at a later time, possibly by accident).

In some embodiments, the optimization module 328 can utilize dynamically-deduced information regarding the state and performance of various resources associated with the optimization module 328. For example, the optimization module 328 may observe that, at the moment, data source P is inaccessible so all data access for P's data needs to use P's replica R instead; or P and R are both available but R is twice as fast as P, so R should be used for twice as many operations as P.

In some embodiments, the optimization module 328 can utilize business rules. For example, when a query is executed by the CEO, the optimization module 328 may give that query a higher priority than if a query is executed by an intern; or, in a training session where 100 trainees all execute the same query per the instructor's advice nearly concurrently, the optimization module 328 may execute the query once and return the same result to all participants.

In some embodiments, the optimization module 328 can utilize analysis of past usage patterns. For example, if a data source is most heavily used during the times of day that two of US, Europe, and Asia are in business hours, then the optimization module 328 may delay certain operations (those that the user stated may be delayed until a later time) until a single region is in business.

In some embodiments, the optimization module 328 can utilize knowledge (with reasonable certainty) of future events. For example, the optimization module 328 may deduce that a query Q against data source P executed now, at 2:55 am, is expected to run for 10 minutes given current load on P, and, if executed on P's replica R instead, it will run for 15 minutes given current load on R. However, the optimization module 328 may also determine that current load is not always an accurate predictor: Q, if executed now on P, will likely run for 25 minutes, not 10, because the optimization module 328 is aware of a separate, nightly 3:00 am query that is scheduled to start 5 minutes from now, and will overload P; so, instead, the optimization module 328 may choose to run Q on R, instead.

In some embodiments, the optimization module 328 can provide an allowance for absolute or probabilistic error margins. For example, consider a query for the average height of 1,000 subjects, of which 100 are stored on a currently slow or inaccessible data source. The optimization module 328 may ignore those 100 subjects, and return quickly the average height of the remaining 900, if the specified allowed error margin in the execution of the query is 10% and either (i) (absolute margin) prior access to the data for those 100 subjects has enabled the optimization module 328 to cache the knowledge that their minimum and maximum heights are within 1 inch of the average of the remaining 900 subjects or (ii) (probabilistic margin) the 100 subjects are only 10% of the total population and therefore, if they are a random subset, they are unlikely to sway the average height.

The SQL-driven distributed operating system 302 can include a join module 310 that can be configured to efficiently perform SQL joins, for example, of database tables from the same data source (e.g., relational databases) or from multiple, disparate sources (e.g., relational databases and NoSQL-based databases). An SQL join can be used to combine records from two or more tables in a database, for example, by combining fields from the tables using values common to each to create a set that can be saved as a new, separate table or used as it is. For example, the join module 310 can handle a join of a small database table and a large database table by loading the small database table in the cache or Random Access Memory (RAM) of one or more compute nodes that are involved in the join and by sharding the large table across multiple, or all, compute nodes.

The SQL-driven distributed operating system 302 can include an aggregation module 312 that can be configured to efficiently perform a variety of SQL aggregations, for example, using Distributed Aggregation Trees and other performance enhancement techniques. These aggregations can include standard SQL aggregation functions, as well as user-defined functions (UDFs).

The SQL-driven distributed operating system 302 can include a flow analysis module 314 that can be configured to perform the computations that may be needed to drive visualizations, for example, through a data visualization client 330. The flow analysis module 314 can also be configured to analyze other flows such as customer flows, which can include paths customers take to purchase, churn, and other insights into customer behaviors. Analysis across such customer interactions can lead to increased customer acquisition, loyalty, and product adoption. In another example, the flow analysis module 314 can also be configured to analyze device behavior flows, which can include paths leading to suboptimal device performance, or even overloading and failure. Such analysis can be used for reducing downtime and ensuring business continuity, for example.

The SQL-driven distributed operating system 302 can include a clustering module 316 and a predictive analysis module 318 that can be configured to perform user-level analytics operations, for example, by using one or more of the other modules of the distributed operation system 302 as building blocks. In some instances, predictive analysis can include algorithms that are expressed in SQL and rely on machine learning techniques, such as neural networks and genetic programming.

As mentioned, the SQL-driven distributed operating system 302 can be utilized to submit SQL commands, for example, through an interface 304 (e.g., workspace interface). SQL is standardized by both the American National Standards Institute (ANSI) and the International Organization for Standardization (ISO). The SQL-driven distributed operating system 302 can be configured to understand and act upon standard SQL. Additionally, in various embodiments, the SQL-driven distributed operating system 302 can extend the standard SQL in a number of ways. For example, the SQL-driven distributed operating system 302 can extend repeated fields and associated, high-performance operations on them. Generally, most table columns in SQL are of scalar quantities, e.g. strings or text, numbers, dates, timestamps, to represent homogeneous collections of objects. In standard SQL, one usually creates a table where each collection element is stored in a separate row. In various embodiments, when utilizing the SQL-driven distributed operating system 302, a column value may be an array (a repeated field). Moreover, that array may contain so-called NULL elements, i.e. elements with an undefined value. Also, the SQL-driven distributed operating system 302 can define SQL functions that extend the set of SQL built-in functions and operate on arrays. These functions are designed to achieve high-performance. For example, arrays that represent small sets may be stored as integer bitmasks in which case array comparison is performed using a single-step comparison of their bitmasks.

In another example, the SQL-driven distributed operating system 302 can extend nested fields and associated, high-performance operations on them. Typically, in order to store complex objects in SQL tables, one usually creates a table whose columns are the fields of the complex object class; then, each row represents a single object instance. For example, the object class Point(Integer x, Integer y) is stored as a table with integer columns x and y; the instance Point(1, 2) is stored as the table row (1, 2). In various embodiments, when utilizing the SQL-driven distributed operating system 302, a column type may be an object class, and its value may be an object instance. Moreover, instances may be NULL, i.e. an undefined instance of the object class. Also, the SQL-driven distributed operating system 302 can define SQL functions that extend the set of SQL built-in functions and operate on such columns (nested fields). These functions are designed to achieve high-performance. For example, the SQL-driven distributed operating system 302 may store a hash value alongside each object instance, and thus determine that two objects are unequal during a SQL equi-join using a single-step hash value comparison instead of comparing all component fields of the two objects one-by-one.

In some embodiments, the SQL-driven distributed operating system 302 can extend nested/repeated or repeated/nested fields and associated, high-performance operations on them. The above repeated and nested fields, as well as standard scalar quantities may be intermixed in arbitrary ways. For example, the type of a table column may be an array of objects, with each object containing a field which is itself an array of integers.

In some embodiments, the SQL-driven distributed operating system 302 can extend user-defined functions (UDFs). Typically, standard SQL defines a number of built-in functions, many of which the SQL-driven distributed operating system 302 implements, to perform analysis. For example, SQL defines the AVG(c) function, which computes the arithmetic mean across all or a subset of values (presumed numeric) within column c of some table. The SQL-driven distributed operating system 302 can allow for a user to extend the set of supported functions via functions composed by the user in any language. Some example languages include Lua, Jython, and Java, but the integration of additional languages is an easy matter for anyone skilled in the art. Moreover, the manner in which the user defines new functions is by issuing commands, through the SQL-driven distributed operating system 302, that are SQL-like in design, but not part of the SQL standard. Thus, for example, the user may issue this SQL command to define a function extract(c) which receives a text string and returns the portion of it that is enclosed by square brackets:

```
CREATE FUNCTION extract(data VARCHAR)
    RETURNS VARCHAR LANGUAGE JYTHON AS $$
def extract(data):
    i0 = data.find("[")
    i1 = data.find("]")
    return data[i0 + 1:i1]
$$;
```

In some instances, UDFs, as described above, operate on scalar quantities and return scalar quantities. The SQL-driven distributed operating system 302 also supports UDFs which return complete tables. These Table-Valued Functions (TVFs) make it possible, for example, for a UDF (and TVF, in that case) to read a spreadsheet file, for example, from a data store, and return its contents as a table whose rows and columns reflect the original file's organizational structure. UDFs, as described above, are insular: they operate against their parameters using operations natively available within the chosen language, and return a result, be it a scalar or a table. However, the SQL-driven distributed operating system 302 (unless configured otherwise for security reasons) also allows UDFs to invoke external services as well. For example, a UDF implemented through the SQL-driven distributed operating system 302 may receive as parameters (i) the name of an existing image file in Joint Photographic Experts Group (JPEG) format and (ii) the name of a non-existent image file in Portable Network Graphics (PNG) format. In this example, the UDF may invoke an executable that reads the former file, converts its format from JPEG to PNG, and writes out the latter file. The UDF returns the undefined value NULL, if the operation succeeded; otherwise, it returns a string containing the error encountered. In another example, a UDF implemented through the SQL-driven distributed operating system 302 may receive as its single parameter a matrix, invoke a native executable that is capable of performing matrix inversion using custom, high performance hardware, feed the parameter matrix into the executable via its standard input stream, read the inverted matrix via the executable's standard output stream, and return that result. In another example, a UDF implemented through the SQL-driven distributed operating system 302 may receive as parameter a United States address that lacks a zip code, forward that address to a public web service provided by the United States Postal Service to locate the proper zip code (this can be done via an HTTP request similar to a browser navigating to the usps.com zip code lookup page), receive the zip code, and return that result.

In this manner, the set of possible computations which the SQL-driven distributed operating system 302 may perform is unbounded: any computation that can be expressed in any computer language (not just those supported as composition languages for UDFs implemented through the SQL-driven distributed operating system 302), even ones that execute partly on a different set of computing resources, can be invoked by queries submitted through the SQL-driven distributed operating system 302, for example.

Additionally, standard SQL does not provide a mechanism for a user to create a parameterized, named sequence of SQL commands, which is a sequence of commands where, for example, the name of a table used in these commands is supplied as a parameter. The SQL-driven distributed operating system 302 can provides this facility or "pipelines". A pipeline is akin to what one skilled in the art may consider a procedure, and may be invoked using another command by which the SQL-driven distributed operating system 302 has extended standard SQL. The SQL-driven distributed operating system 302 also includes extensions to other parts of the SQL standard for the benefit of the above extensions. Anyone skilled in the art may deduce the adjunct extensions mandated by the ones listed above. For example, the standard SQL information schema can only describe the standard SQL data types. In contrast, the SQL-driven distributed operating system 302 can extend the SQL information schema to address nested and repeated fields.

In addition to extending SQL, the SQL-driven distributed operating system 302 can also extend the state of the art in data analytics in a number of dimensions. The SQL extensions described above necessitate additional extensions to other functional components of the SQL-driven distributed operating system 302. For example, the SQL-driven distributed operating system 302 can extend existing file formats so that they may store tables containing nested and repeated fields. In one example, consider a table with two rows, each with two columns, the first column being the name of a point of text type, and the second column being its 2D coordinates of a custom nested type {x,y}, where x and y are both integers. The two rows are:

a, {x:1, y:2}
b, {x:3, y:4}

In this example, the extension of file formats provided by the SQL-driven distributed operating system 302 allows for regular, row-oriented storage of the above table in a file with contents "a 1 2 b 3 4". The extension of file formats provided by the SQL-driven distributed operating system 302 also allows for top-level-only column-oriented storage of the above table in a file with contents "a b 1 2 3 4". In this format, a query that filters out rows based on the value of the first column may read only the first third of the file to decide which subset of rows meet the filtering criteria. The extension of file formats provided by the SQL-driven distributed operating system 302 can also allow for column-oriented storage of the above table at all levels (even grouping all x values together ahead of the y values) in a file with contents "a b 1 3 2 4". This format helps further with queries that filter rows based on the value of an nested field.

With respect to the SQL-driven distributed operating system 302, what constitutes a data source or sink is broader than is typically the case in most software systems that manage or operate on data. For example, the SQL-driven distributed operating system 302 makes use of existing inter-connectivity interfaces (e.g., ODBC) so that users may couple the SQL-driven distributed operating system 302 with existing compatible software components (e.g., ODBC drivers) to enable the SQL-driven distributed operating system 302 access to data sources and sinks supporting such interfaces. Moreover, through the use of TVFs, users may transform arbitrary data sources into tables managed by the SQL-driven distributed operating system 302. Furthermore, the data source and/or data sink APIs provided by the SQL-driven distributed operating system 302 may be extended to provide access to arbitrary sources (e.g., live connections to cameras, microphones, temperature, or GPS sensors) or sinks (e.g., switches, actuators, or motors).

Further, with respect to the SQL-driven distributed operating system 302, what constitutes a computation is broader than is typically the case in most software systems. Despite using SQL, the SQL-driven distributed operating system 302 is not limited to the operators mandated by the SQL standard. For example, operators utilized through the SQL-driven distributed operating system 302 may be used to effect analysis and manipulation of image and other media.

UDFs, pipelines, the scripts, data source/sink extensions, and other mechanisms are all ways in which the SQL-driven distributed operating system 302 may be extended by users. The SQL-driven distributed operating system 302 can include a variety of such mechanisms, some intended for training purposes, and others intended for use in production deployments as building blocks of higher-level operations. For example, the SQL-driven distributed operating system 302 can include UDFs to re-compress an image from JPEG to PNG format; pipelines and scripts for clustering, descriptive, and predictive analytics; and TVFs to turn an Excel file into a table and vice versa.

In some embodiments, the SQL-driven distributed operating system 302 can provide auditing of its activity. That activity may be analyzed using an interactive data flow visualization tool, as well as through the SQL-driven distributed operating system 302 itself, and thus subjected to arbitrary complex analyses.

In various embodiments, the SQL-driven distributed operating system 302 can be installed on various computing platforms including, for example, computing devices, computing systems, cloud computing systems, to name some examples. An administrator, or user, of the SQL-driven distributed operating system 302 can allow the SQL-driven distributed operating system to operate at various times throughout the day (e.g., overnight) to perform various operations (e.g., computations). Such operations may be performed with respect to any security constraints, for example, regarding data encryption and/or data movement.

In various embodiments, the SQL-driven distributed operating system 302 can support resource sharing techniques. For example, the SQL-driven distributed operating system 302 can be running on a computing system of a second user and can be configured to charge a first user that initiates an operation that is performed by the computing system of the second user. Similarly, storage space can also be made available through the computer system of the second user and the SQL-driven distributed operating system 302 may use the storage space for storing temporary data which may be subject to any security constraints, for example, regarding data encryption and/or data movement. In various embodiments, the second user may be compensated based on the usage of the storage space.

Such resource sharing techniques may also be employed equally well in server settings. For example, the SQL-driven distributed operating system 302 may be used to optimally allocate resources (e.g., computing resources, storage resources, etc.) across servers in a computing datacenter. In another example, a United States company that has a fixed amount of computing resources but uses them very little at night may make its resources available to other companies that are located in Europe, thereby allowing such companies to take advantage of the computing resources during their business hours. In another example, a distributed operating system 302 can be implemented as a cloud computing-based service may rent out and guarantee a fixed amount of computing resources to a customer while still reserving the right to use unused portions of those resources for other internal purposes, or for other customers, provided such use is terminated as soon as the customer wishes to re-engage these resources for her own purposes.

The SQL-driven distributed operating system 302 need not operate on large computer systems, be they server or desktop computers. For example, a light footprint version of distributed operating system 302 may operate on portable devices including, for example, cell phones and/or tablet computing devices. Such an approach allows for the SQL-driven distributed operating system 302 to act as the underlying mechanism to transfer information between a computing system of a user, a cloud-based account of the user (e.g., for hosted email, social networking, etc.), and a mobile device (e.g., cell phone) of the user. In other words, to not think of such components as being distinct from one another, the approaches described herein allow for such components to be treated as invisible components of a unified system which, collectively, offers high computation power and storage (for example, by leveraging the cloud computing system), high portability (for example, by leveraging the mobile device), and fast access to medium sized data and medium computation (for example, by leveraging the computing system and its communications link (e.g., Wi-Fi, Bluetooth, etc.) to the mobile device, and its high-speed connection to the cloud computing system). In such a consumer-oriented business model, the SQL-driven distributed operating system 302 may provide local connectivity, as described, as well as global connectivity, interconnecting local users. In either case, consumer business models applicable to network service providers, be they wireless data (e.g., Wi-Fi) providers or Internet service providers, can become possible in the data management domain, which is traditionally subject to enterprise business models.

In various embodiments, a light footprint version of the SQL-driven distributed operating system 302 that operates on commodity, consumer hardware, such as cell phones or tablets, as well as TV set-top boxes and gaming consoles, may turn such simple devices into compute nodes of a larger, server-class distributed system composed of elementary non-server-class components. This approach is similar in principle to the manner in which Redundant Arrays of Independent Disks (RAID) systems use multiple low-end disks as components to build server-class storage systems. For example, consumer cell phones in Europe, while they recharge at night, may be used for daytime business operations in the United States. Similarly, home gaming consoles, which possess powerful graphics processing hardware capable of massive, yet niche, computations at high-speed, may be used during business hours by businesses. In this manner, the SQL-driven distributed operating system 302 can extend the business models mentioned above to a global scale, involving participants with a wide range of equipment.

The light footprint version of the SQL-driven distributed operating system 302 may operate on any computer-enabled device, such as vehicles, electricity meters, or voltmeters. Thus, a car manufacturer may use the SQL-driven distributed operating system 302 to monitor vehicle location for anti-theft purposes, to monitor engine performance to recommend repairs or maintenance, or to issue recall notifications via the on-board computer. In another example, a utility company may use the SQL-driven distributed operating system 302 to measure electricity consumption for billing purposes or to enable junior field technicians to communicate their measurement with senior main office technicians who can assist with troubleshooting.

In these example scenarios, data movement can be augmented with computation and analysis, possibly against additional data sources. For example, if the gas consumption of a vehicle does not match terrain information at the vehicle's location—which can involve an analytical computation requiring access to global map information and aggregate statistics on engine performance—this may suggest an engine problem. Electricity consumption may also be compared to normal patterns and possibly correlated to temperature information, for example. The analysis descried with respect to the example scenarios may lead to actions that can also be taken via the SQL-driven distributed operating system 302. For example, in the event of vehicle theft, the SQL-driven distributed operating system 302 may turn off the engine of a stolen vehicle. In another example, in the event of a flood, the SQL-driven distributed operating system 302 may turn off electricity supply to flooded areas to minimize the risk of electrocution. In the example scenarios described above, the SQL-driven distributed operating system 302 can facilitate the development of applications to which the SQL-driven distributed operating system 302 serves as the underlying platform. Business models applicable to general software platforms may thus become viable in setting where, thus far, software has been a minor participant rather than a core technology.

Another historical pattern that has emerged in computing is the gradual speed-up in the cycle of experimentation. This cycle consists of composing a program (or a model), running the program (or a simulation), evaluating the results, altering the program, and re-running it, and so on. This cycle of iterative improvement is natural to scientific exploration in general, but, in computing, the duration of this cycle has been drastically reduced over the years. In the early days, the slowest part of the above-described cycle was running the program, leading to extensive human operator downtime. Nowadays, for most computer tasks, the human operator has little downtime and productivity has risen dramatically because computers have grown faster. Moreover, computer languages and tools have developed that make it much easier to express a desired computation naturally, or by leveraging existing technologies and paradigms: not every human operator has to reinvent the same wheel. However, for many tasks involving complex computation or massive amounts of data, the execution time dominates and, for large-scale distributed computing and storage, the infrastructure is still immature and complex for human operators to handle.

In various embodiments, the SQL-driven distributed operating system 302 can be configured to address both of the above-mentioned dimensions. For example, as noted earlier, the SQL-driven distributed operating system 302 is a high-performance system that optimizes across numerous dimensions. Further, the user experience is at a high-level of abstraction and quite a bit removed from the underlying mechanics, which the SQL-driven distributed operating system 302 manages transparently on behalf of most users (administrators of the SQL-driven distributed operating system 302 being excluded). In one example, the SQL-driven distributed operating system 302 is able to achieve both goals through a mixed use of SQL, Jython, Java, other UDF composition languages, and native tools. For example, SQL is a well-known functional/declarative language, and thus expresses the desired computation in a manner that is colloquially described as "tell me what outcome you want". This is generally a simple task for the user, which provides the SQL-driven distributed operating system 302 a lot of latitude in choosing the steps that lead to the desired outcome so that those steps will execute in the shortest time possible. SQL, as implemented by the SQL-driven distributed operating system 302, can include support for advanced SQL features, such as triggers and common table expressions, so that the user may compose complex control flows (e.g. conditional execution or tail recursion) wholly within SQL and thus leverage its declarative nature and the ability of the SQL-driven distributed operating system 302 to optimize execution of these flows. Jython is also a well-known language, but a procedural/imperative one, which can express a computation as "tell me what steps I should take so that the outcome of those steps will match your intent". This is a far more natural language for classically trained computer scientists to express their algorithms. Moreover, Jython can use Java packages seamlessly, which means that the user may leverage a large amount of pre-existing software as building blocks to solve larger problems. Native tools typically cannot be optimized, but they provide ready-made solutions to subproblems, and can thus be readily used as building blocks.

Returning to the original point, the SQL-driven distributed operating system 302 enables productivity gains via higher performance and ease of expressing new algorithms, which in turns shortens the duration of the cycle of experimentation, leading to faster innovation. This makes it possible for the SQL-driven distributed operating system 302 to adopt business models that quantify not only the use of the SQL-driven distributed operating system 302 (e.g., number of queries executed), but also the increase in productivity (e.g., time saved in completing an experimental cycle). Additionally, the SQL-driven distributed operating system 302 possesses two key abilities that enable the SQL-driven distributed operating system 302 to be deployed as a side-by-side solution to existing systems. For example, the SQL-driven distributed operating system 302 may act on data in situ, without first migrating the data into storage owned and managed by the SQL-driven distributed operating system 302. Moreover, the SQL-driven distributed operating system 302 is able to run on both bare-metal systems (where the hardware is controlled by the operating system and the SQL-driven distributed operating system 302 is installed as a software application within that operating system) as well as on virtualized systems (where, typically, the hardware is controlled by a host operating system, on which a virtual machine application creates the perception of an independent virtual hardware with its own, distinct guest operating system, and the SQL-driven distributed operating system 302 is installed as a software application within the guest operating system). The latter mechanism means that virtual, not physical, hardware is sufficient for the SQL-driven distributed operating system 302 to become available within an enterprise or even on a personal computer.

The above-described features and approaches can enable business models that allow for gradual adoption of the SQL-driven distributed operating system 302 with little commitment, or a large upfront expenditure in capital, or staffing, or time spent in data migration; for example, a rental model. Moreover, the ability of the SQL-driven distributed operating system 302 to perform massive computation on a cloud despite a small on-premises footprint (to gain access to on-premises data sources) enables use of elastic costing models (pay-as-you-go and pay-for-what-you-use).

Figure 4:
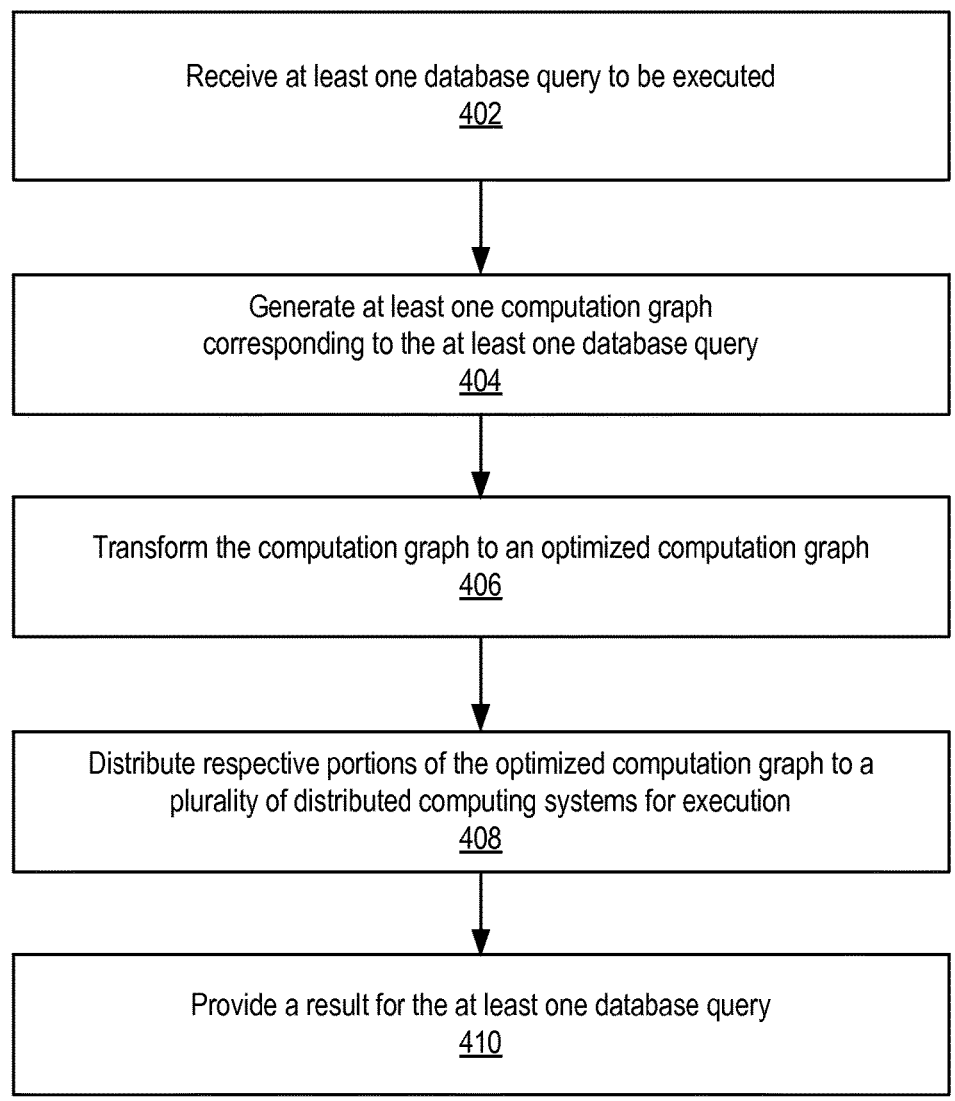
FIG. 4 illustrates an example method for performing distributed query execution, according to an embodiment of the present disclosure.

FIG. 4 illustrates an example method 400 for performing distributed query execution, according to an embodiment of the present disclosure. It should be appreciated that there can be additional, fewer, or alternative steps performed in similar or alternative orders, or in parallel, within the scope of the various embodiments unless otherwise stated.

At block 402, at least one database query to be executed is received. At block 404, at least one computation graph corresponding to the at least one database query is generated. At block 406, the computation graph is transformed to an optimized computation graph. At block 408, respective portions of the optimized computation graph are distributed to a plurality of distributed computing systems for execution. At block 410, a result for the at least one database query is provided.

Hardware Implementation

Figure 5:
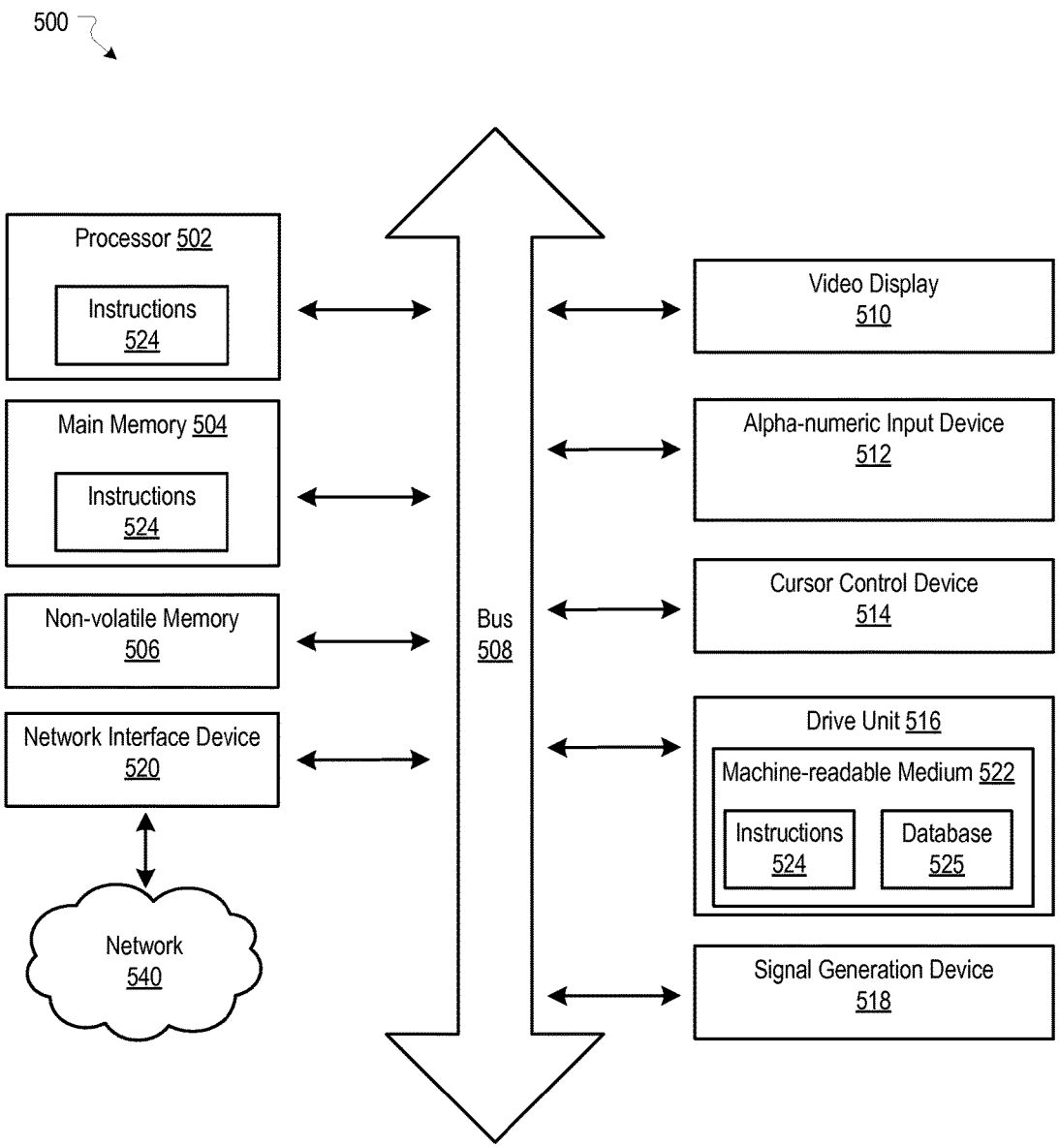
FIG. 5 is a diagrammatic representation of an embodiment of the machine, within which a set of instructions for causing the machine to perform one or more of the embodiments described herein can be executed, according to an embodiment of the present disclosure.

FIG. 5 is a diagrammatic representation of an embodiment of the machine 500, within which a set of instructions for causing the machine to perform one or more of the embodiments described herein can be executed. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with the server to facilitate operations of the server and/or to access the operations of the server.

The machine 500 includes a processor 502 (e.g., a central processing unit (CPU), a graphics processing unit (GPU), or both), a main memory 504, and a nonvolatile memory 506 (e.g., volatile RAM and non-volatile RAM), which communicate with each other via a bus 508. In some embodiments, the machine 500 can be a desktop computer, a laptop computer, personal digital assistant (PDA), or mobile phone, for example. In one embodiment, the machine 500 also includes a video display 510, an alphanumeric input device 512 (e.g., a keyboard), a cursor control device 514 (e.g., a mouse), a drive unit 516, a signal generation device 518 (e.g., a speaker) and a network interface device 520.

In one embodiment, the video display 510 includes a touch sensitive screen for user input. In one embodiment, the touch sensitive screen is used instead of a keyboard and mouse. The disk drive unit 516 includes a machine-readable medium 522 on which is stored one or more sets of instructions 524 (e.g., software) embodying any one or more of the methodologies or functions described herein. The instructions 524 can also reside, completely or at least partially, within the main memory 504 and/or within the processor 502 during execution thereof by the computer system 500. The instructions 524 can further be transmitted or received over a network 540 via the network interface device 520. In some embodiments, the machine-readable medium 522 also includes a database 525.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to any of the computer systems described herein through a network interface such as a modem or Ethernet interface, can also be used.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals. The term "storage module" as used herein may be implemented using a machine-readable medium.

In general, routines executed to implement the embodiments of the invention can be implemented as part of an operating system or a specific application, component, program, object, module or sequence of instructions referred to as "programs" or "applications". For example, one or more programs or applications can be used to execute any or all of the functionality, techniques, and processes described herein. The programs or applications typically comprise one or more instructions set at various times in various memory and storage devices in the machine and that, when read and executed by one or more processors, cause the machine to perform operations to execute elements involving the various aspects of the embodiments described herein.

The executable routines and data may be stored in various places, including, for example, ROM, volatile RAM, non-volatile memory, and/or cache. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of machines, those skilled in the art will appreciate that the various embodiments are capable of being distributed as a program product in a variety of forms, and that the embodiments described herein apply equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", or the like means that a particular feature, design, structure, or characteristic described in connection with the embodiment is included in at least one embodiment of the disclosure. The appearances of, for example, the phrases "according to an embodiment", "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention, both independently and as an overall system, and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

What is claimed is:

1. A method, implemented at a computer system including one or more processors, for optimizing query execution, the method comprising:
   receiving a plurality of database queries to be executed;
   determining at least one computation graph corresponding to the plurality of database queries, the at least one computation graph comprising a graph of dependencies describing execution of the plurality of database queries, the computation graph being configured to execute the plurality of database queries within a single database computing system;
   generating one or more candidate transformations based on the at least one computation graph, each of the one or more candidate transformations being associated with a possible transformation of the computation graph, generating the one or more candidate transformations including generating a computation cost associated with execution of each of the one or more candidate transformations;
   dynamically optimizing the computation graph to thereby generate an optimized computation graph using at least one of the one or more candidate transformations associated with a lowest computation cost, including dynamically optimizing the computation graph for performing execution of the plurality of database queries across a plurality of distributed database computing systems;
   determining whether the lowest computation cost meets at least one predetermined stopping criterion, and
      when it is determined that the lowest computation cost does not meet the at least one predetermined stopping criterion, generating another one or more candidate transformations based on the at least one computation graph; or
      when it is determined that the lowest computation cost meets the at least one predetermined criterion, distributing respective portions of the optimized computation graph to the plurality of distributed database computing systems for execution of the plurality of database queries; and
      providing one or more results corresponding to execution of the plurality of database queries across the plurality of distributed database computing systems.

2. The computer-implemented method of claim 1, further comprising:
   evaluating the one or more candidate transformations for the computation graph, based at least in part on an objective function, to generate the optimized computation graph.

3. The computer-implemented method of claim 2, wherein the objective function is based at least in part on a weight vector that includes a plurality of weights.

4. The computer-implemented method of claim 3, wherein the weights included in the weight vector are tuned based at least in part one or more machine learning techniques.

5. The computer-implemented method of claim 4, wherein the machine learning techniques include Gaussian Processes.

6. The computer-implemented method of claim 3, wherein the weights included in the weight vector are tuned based at least in part weight regularization techniques.

7. The computer-implemented method of claim 3, wherein the weights included in the weight vector are tuned based at least in part on feature hashing techniques.

8. The computer-implemented method of claim 3, wherein the weight vector is automatically tuned based at least in part on respective amounts of time needed to execute one or more queries.

9. The computer-implemented method of claim 3, the method further comprising:
   performing, by the computing system, adaptive learning by running one or more queries having a less than optimal cost; and
   adjusting, by the computing system, one or more weights corresponding to the weight vector.

10. The computer-implemented method of claim 1, wherein the respective cost for each candidate transformation is determined over a threshold period of time, the method further comprising:
    upon expiration of the threshold period of time, determining, by the computing system, the optimized computation graph based at least in part on the respective costs for the candidate transformations and on the respective costs for the threshold number of candidate transformations.

11. The computer-implemented method of claim 1, wherein the respective cost for a candidate transformation is based at least in part on one or more of: a cost associated with a node of a candidate computation graph, a cost associated with a portion of the candidate computation graph, or a cost associated with the entire computation graph.

12. The computer-implemented method of claim 1, wherein the respective cost for each candidate transformation is determined based at least in part on an A-star search algorithm.

13. The computer-implemented method of claim 1, wherein the respective portions of the optimized computation graph are distributed to one or more of the distributed computing systems for which the respective portions are optimized for execution.

14. The computer-implemented method of 1, the method further comprising:

determining, by the computing system, a pipeline for executing one or more queries, the one or more queries including the at least one database query; and optimizing, by the computing system, the one or more queries in the pipeline.

15. The computer-implemented method of claim 14, the method further comprising:

determining, by the computing system, that the pipeline is a repeated pipeline; and determining, by the computing system, a cache for the pipeline.

16. The computer-implemented method of claim 14, wherein at least one input corresponding to the pipeline and at least one output corresponding to the pipeline are able to be defined using an extended Structured Query Language (SQL).

17. A computer system comprising:

at least one processor; and a computer-readable media having stored thereon computer-executable instructions that are executable by the at least one processor to cause the computer system to optimize query execution, the computer-executable instructions including instructions to perform at least the following:

receive a plurality of database queries to be executed;

determine at least one computation graph corresponding to the plurality of database queries, the at least one computation graph comprising a graph of dependencies describing execution of the plurality of database queries, the computation graph being configured to execute the plurality of database queries within a single database computing system;

generate one or more candidate transformations based on the at least one computation graph, each of the one or more candidate transformations being associated with a possible transformation of the computation graph, generating the one or more candidate transformations including generating a computation cost associated with execution of each of the one or more candidate transformation;

dynamically optimize the computation graph to thereby generate an optimized computation graph using at least one of the one or more candidate transformations associated with a lowest computation cost, including dynamically optimizing the computation graph for performing execution of the plurality of database queries across a plurality of distributed database computing systems;

determine whether the lowest computation cost meets at least one predetermined stopping criterion, and when it is determined that the lowest computation cost does not meet the at least one predetermined stopping criterion, generate another one or more candidate transformations based on the at least one computation graph; or when it is determined that the lowest computation cost meets the at least one predetermined criterion, distribute respective portions of the optimized computation graph to the plurality of distributed database computing systems for execution of the plurality of database queries; and provide one or more results corresponding to execution of the plurality of database queries across the plurality of distributed database computing systems.

18. A computer program product including one or more computer-readable storage devices having stored thereon computer-executable instructions that are executable by at least one processor of a computing system to cause the computing system to optimize query execution, the computer-executable instructions including instructions to perform at least the following:

receive a plurality of database queries to be executed;

determine at least one computation graph corresponding to the plurality of database queries, the at least one computation graph comprising a graph of dependencies describing execution of the plurality of database queries, the computation graph being configured to execute the plurality of database queries within a single database computing system;

generating one or more candidate transformations based on the at least one computation graph, each of the one or more candidate transformations being associated with a possible transformation of the computation graph, generating the one or more candidate transformations including generating a computation cost associated with execution of each of the one or more candidate transformations;

dynamically optimizing the computation graph to thereby generate an optimized computation graph using at least one of the one or more candidate transformations associated with a lowest computation cost, including dynamically optimizing the computation graph for performing execution of the plurality of database queries across a plurality of distributed database computing systems;

determining whether the lowest computation cost meets at least one predetermined stopping criterion, and when it is determined that the lowest computation cost does not meet the at least one predetermined stopping criterion, generating another one or more candidate transformations based on the at least one computation graph; or when it is determined that the lowest computation cost meets the at least one predetermined criterion, distribute respective portions of the optimized computation graph to the plurality of distributed database computing systems for execution of the plurality of database queries; and provide one or more results corresponding to execution of the plurality of database queries across the plurality of distributed database computing systems.

* * * * *